July 8, 1958  W. GERMERSHAUSEN ET AL  2,842,607
HERMETICALLY-SEALED STORAGE BATTERY
Filed March 29, 1954

WERNER GERMERSHAUSEN
FREIMUT PETERS
FRITZ SOEDING
INVENTOR.

BY
Richardson, David and Nardon
ATTORNEYS.

United States Patent Office 2,842,607
Patented July 8, 1958

2,842,607

HERMETICALLY-SEALED STORAGE BATTERY

Werner Germershausen, Frankfurt am Main, Freimut Peters, Hagen in Westphalia, and Fritz Soeding, Westhofen, Westphalia, Germany, assignors to Firma Accumulatoren-Fabrik Aktiengesellschaft, Hagen in Westphalia, Frankfurt am Main, Germany Application March 29, 1954, Serial No. 419,312

6 Claims. (Cl. 136—6)

This invention relates to a secondary cell known as a storage cell and also known under the misnomer of a storage battery, of the hermetically sealed type.

In particular the invention relates to a storage cell in which not only is there gas development during the charging or upon standing and in which the gas developed is again consumed by special means, but furthermore in which the access of atmospheric oxygen to the electrodes is also prevented. An alkaline electrolyte will preferably be used for storage cells in accordance with this invention.

Cells of the conventional type evolve gas mainly upon charging, but also upon standing in currentless condition, so that it is necessary to see to the escape of these gases from the cells, for instance by valves or the like.

It has been proposed to cause union or consumption of such gases, without combustion, thereby allowing hermetic sealing of the cell, by causing building up of gas pressure to change the electrolyte level, so as to expose portions of one or more electrodes, by which portions the gases can be consumed and converted into combined non-gaseous forms.

Since the elimination of hydrogen in this way is considerably more difficult than the elimination of oxygen, since a special treatment of the positive plate of the cell is necessary for this, it has already been proposed to increase the size of the negative electrode which consumes the oxygen, and to effect the charging of the originally open storage battery only to such an extent that the negative electrode did not effect any after-generation of gas, or only an unsubstantial amount. The development of hydrogen was therefore avoided by charging the negative electrode, which due to its larger size naturally also had a greater capacity than the positive electrode, at most just until the start of the hydrogen generation and therefore the potential of hydrogen evolution was not yet reached. At this time, however, oxygen could already develop at the positive electrode. The storage batteries according to these proposals could be hermetically closed only during the discharge, and had to be opened again for the charging.

In this way there could be produced in the storage batteries only oxygen which, by contact with parts of the larger charged negative electrodes which were exposed by a corresponding oxygen pressure with displacement of the electrolyte, could be eliminated relatively easily.

One purpose of the instant invention is to afford a storage cell which can be hermetically sealed, thereby no longer ordinarily requiring upkeep or servicing attention.

Another purpose of this invention is to provide a storage cell which shall be capable of operation in any position, and which shall have a reserve source of electrolyte incorporated therein.

Another object of this invention is to provide a hermetically sealed storage cell wherein passage of gas, either into or out of the cell, is prevented, and yet in which undue gas pressure will not build up within such cell, so as to invite rupture of the container thereof by stresses due to such excess pressure.

The storage battery in accordance with the present invention has electrodes which are dimensioned with respect to each other in the manner known in the case of open alkaline storage batteries. Furthermore, the storage battery, before the hermetic closure thereof, is charged in the known manner only to such an extent that while the positive electrode evolves oxygen, the negative electrode on the other hand still does not generate hydrogen, or upon standing in currentless condition, does not give any after-generation thereof. Since in the case of the negative electrode the generation of gas starts only after the charging, it is therefore charged also at the time of the hermetic closing of the cell.

In accordance with the invention, movement of the electrolyte level through the gas generated is not necessary in order to bring temporarily parts of the negative electrodes in contact with the oxygen developed and thus to consume the same. The electrolyte necessary for the passage of current between the electrodes of opposite polarity is rather continuously localized (fixed) in an absorptive intermediate substance of non-conductive material, and in the electrodes. This localization of the electrolyte is effected in such a manner that the electrodes and the intermediate substances have extremely fine pores which take up and hold the electrolyte by capillary action. The pores in the intermediate substance are so fine that the gas bubbles developed at the electrodes do not enter into them, by displacing the electrolyte, or can penetrate them only to the opposite electrode. The intermedaite substance must in accordance with the invention, therefore, be filled at all times with liquid in order to avoid a local interruption of the current by gas bubbles enclosed in the intermediate substance and thus to prevent an undesired increase of the internal resistance and a loss of capacity. Such separators can be formed of textile fabric or plastics resistant to the action of electrolyte and having the threads closely woven, or of a fabric, paper, organic membranes such as regenerated cellulose or micro-porous films of plastic or rubber. The above examples are given by way of example and not of exclusion.

The porous electrodes are formed with suitable active material and the adjacent faces of opposite polarity are completely, or for the most part, covered by the separators saturated with liquid as above described, thereby keeping the desired low internal resistance of the cell. The use of such porous electrodes, together with porous separators which contain the electrolyte, makes it possible to remove the electrolyte not held fast by capillary action from the storage battery before the hermetic closing thereof.

Reference is now made to the hereunto appended drawings.

Figure 1:
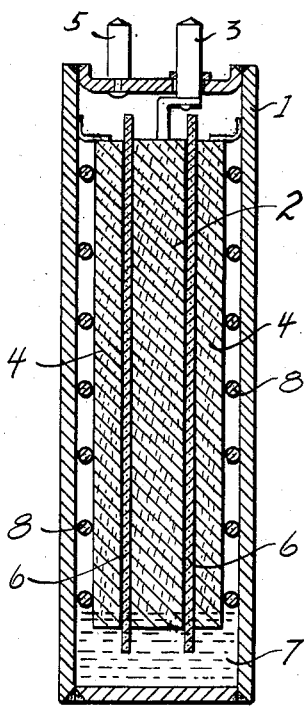
Figure 1 shows a cell having one positive and two negative electrodes.

Housing 1 contains positive electrode 2 separated from negative electrodes 4, lying on each side thereof, by means of separators 6. The negative electrodes may be connected with the housing electrically but are physically spaced therefrom by the provision of spacers 8. The separators, as shown in Figure 1, dip into the electrolyte reserve (7) at the bottom of the cell. The electrolyte reserve can, however, also be so dimensioned that the electrodes also dip into it. The negative electrodes are located with the parts which are not covered by the separators, in the free gas space above and to the side of the electrodes. Suitable terminals 3 and 5 are connected to the respective electrodes.

In a still simpler embodiment (not shown) a plate group can alternately consist of only a single positive and single negative electrode, but for reasons well-known in the art, it is usual to employ two negatives for one positive, as shown in Fig. 1.

Figure 2:
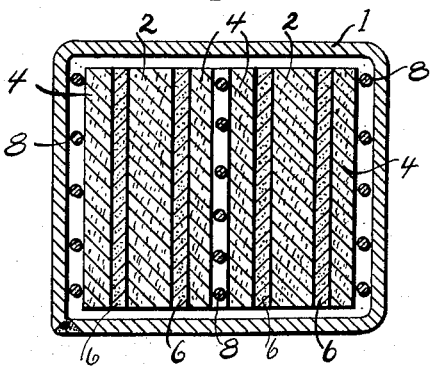
Figure 2 shows another form of cell having two positive electrodes each provided with two co-operating negative electrodes.

In Fig. 2, spacers 8 not only space the outer negative plates 4 from the cell walls, but also separate the two innermost negative electrodes 4 from one another, thus making certain that substantially one complete side of each and every negative electrode is exposed to contact with the free gas in the cell, i. e. to the oxygen electrolytically generated and consumed by the portions of the negative plate not covered by electrolyte. Other combinations of different numbers and ratios of negative and positive plates can be employed with this invention, as apparent to the man skilled in the art.

Figure 3:
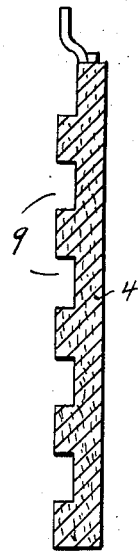
Figure 3 shows a negative electrode having slots on one side.

In Fig. 3, a negative plate 4, has slots 9, in the side of the plate which is away from the separator and which is exposed to the free gases of the cell. These slots furnish increased surface, to promote absorption of free oxygen.

The device of this invention operates substantially as follows:

The battery previously formed in the customary manner is charged at most until gassing of the positive electrode, whereupon all excess electrolyte, except that which is held fast in the separators and in the electrodes or which is in the reserve (storage) space (7), is removed and the battery is hermetically closed. If the storage battery is now charged beyond the point at which the positive electrode generates gas, i. e., develops oxygen, while the negative electrode however still does not generate hydrogen, there are present, per se, the same conditions with respect to gas generation as are known from older proposals. At the positive electrode upon further charging or upon standing in currentless condition, oxygen is produced, which escapes between the positive electrodes and the adjacent separators into the gas space surrounding the electrodes.

This evolving oxygen cannot penetrate into the pores of the separators since their diameter is too small, and the electrolyte accordingly is held fast due to the great capillary action. It rather escapes between the surface of the positive electrodes and the adjacent separators into the gas space surrounding the electrodes. In this way it comes into contact with parts of the negative electrode which extend laterally and upward into this space and also into contact with the exposed rear sides of the negative electrodes, since they are separated by the spacers (8). The exposed sides of the negative plates may be additionally provided with slots or recesses, in order to increase the area thereof available for consumption of the free oxygen. It can be readily seen that the spacers provided both in the forms of Fig. 1 and Fig. 2 make sure that one side of every negative plate is available to consume free oxygen. The modus operandi of this consumption of oxygen by the negative plate is already familiar in the prior art devices previously mentioned.

Absorption of the oxygen takes place in the manner that it reacts electrochemically with the exposed parts of the negative electrodes and in this way completely suppresses the evolution of hydrogen at the negative electrode upon charging.

By the fixing (localization) of the electrolyte and the exposing of parts of the negative electrode, it is therefore possible to dispense with change of the electrolyte level in order to expose parts of the negative electrode. Furthermore, the inventor has succeeded in an excellent manner in hermetically sealing alkaline storage cells constructed in accordance with the invention, permanently, i. e., even during the charging, and in so controlling the gas evolution that oxygen only is evolved.

The reserve electrolyte cell allows freely movable electrolyte to make continuous contact with the bottom of the separators, so that these latter shall be continuously saturated by capillary action. It is possible that such reserve liquid may be made great enough in amount so as to extend upwardly somewhat over the negative electrode, but this is not a critical point, provided only that there be left sufficient uncovered area of each negative plate to function for oxygen consumption.

By the use of devices formed in accordance with this invention, even in case of long overcharging, only a slight gas pressure due to free oxygen is produced within the cell, which pressure rapidly disappears after termination of the charging, due to reaction of the exposed outer sides of the negative electrodes with the generated free oxygen, so as to consume this gas by electrochemical reactions without flammable reactions of a combustive type.

It is of course possible to assemble storage cells constructed in accordance with this invention into groups according to the electromotive force and current intensity desired, such a single group constituting a storage battery.

The storage cell of this invention ensures dependability of operation to a high degree, without need of servicing such cell. The portions of the active material held by the negative electrode which are consumed by the absorption of oxygen are again automatically charged during the next charging cycle and are thus reactivated. This avoids the need of movement of the electrolyte as to level, as above described in connection with certain prior art constructions.

While there have been shown and described certain embodiments of this invention, these are by way of example only, and the scope of this invention is limited only by the hereunto appended claims.

What is claimed is:

1. A storage cell of the hermetically sealed alkaline type comprising in combination in a casing at least one porous negative electrode, at least one porous positive electrode and at least one porous separator situated between and contacting said electrodes, an alkaline electrolyte substantially held in the pores of the separator and the electrodes by capillary action, at least one of said negative electrodes having its rear face spaced from a wall of the casing, and spacer means between said rear face and said wall forming a free gas space between said rear face and said wall, said rear face being in contact with the oxygen generated in the cell, for removing said oxygen.

2. A storage cell of the hermetically sealed alkaline type comprising in combination in a casing at least one porous negative electrode, at least one porous positive electrode and at least one porous separator situated between and contacting said electrodes, an alkaline electrolyte substantially held in the pores of the separator and the electrodes by capillary action, at least one of said negative electrodes having its rear face spaced from a wall of the casing, and spacer means between said rear face and said wall forming a free gas space between said rear face and said wall, said rear face being in contact with the oxygen generated in the cell, for removing said oxygen, the porous separator having very fine pores and being saturated with liquid electrolyte so that free gases, generated at the surfaces of the electrodes, are not able substantially to penetrate the separator.

3. A storage cell of the hermetically sealed alkaline type comprising in combination in a casing at least one porous negative electrode, a porous positive electrode, at least one porous separator situated between and contacting said electrodes, an alkaline electrolyte substantially held in the pores of the separator and the electrodes by capillary action, at least one of said negative electrodes having its rear face spaced from a wall of the casing, and spacer means between said rear face and said wall forming a free gas space between said rear face and said wall, said rear face being in contact with the oxygen generated in the cell, for removing said oxygen, and an electrolyte reserve in said casing contacting the separator and electrodes.

4. A storage cell according to claim 2, the cell having only one positive and one negative electrode.

5. A storage cell according to claim 2, the cell having one positive electrode and two negative electrodes.

6. A storage cell of the hermetically sealed type, comprising in combination in a casing at least one porous negative electrode, at least one porous positive electrode and at least one porous separator situated between and contacting said electrodes, an alkaline electrolyte substantially held in the pores of the separator and the electrodes by capillary action, at least one of said negative electrodes having its rear face spaced from a wall of the casing and spacer means between said rear face and said wall forming a free gas space between said rear face and said wall, said rear face being in contact with the oxygen generated in the cell for removing said oxygen, the rear faces being provided with recesses for increasing the contact with the gas space.

References Cited in the file of this patent

UNITED STATES PATENTS

| | | |
|---|---|---|
| 718,205 | Hutchison | Jan. 13, 1903 |
| 2,104,973 | Dassler | Jan. 11, 1938 |
| 2,422,045 | Ruben | June 10, 1947 |
| 2,571,927 | Neumann et al. | Oct. 16, 1951 |
| 2,614,138 | Jacquier | Oct. 14, 1952 |
| 2,651,669 | Neumann | Sept. 8, 1953 |